Patented Nov. 24, 1942

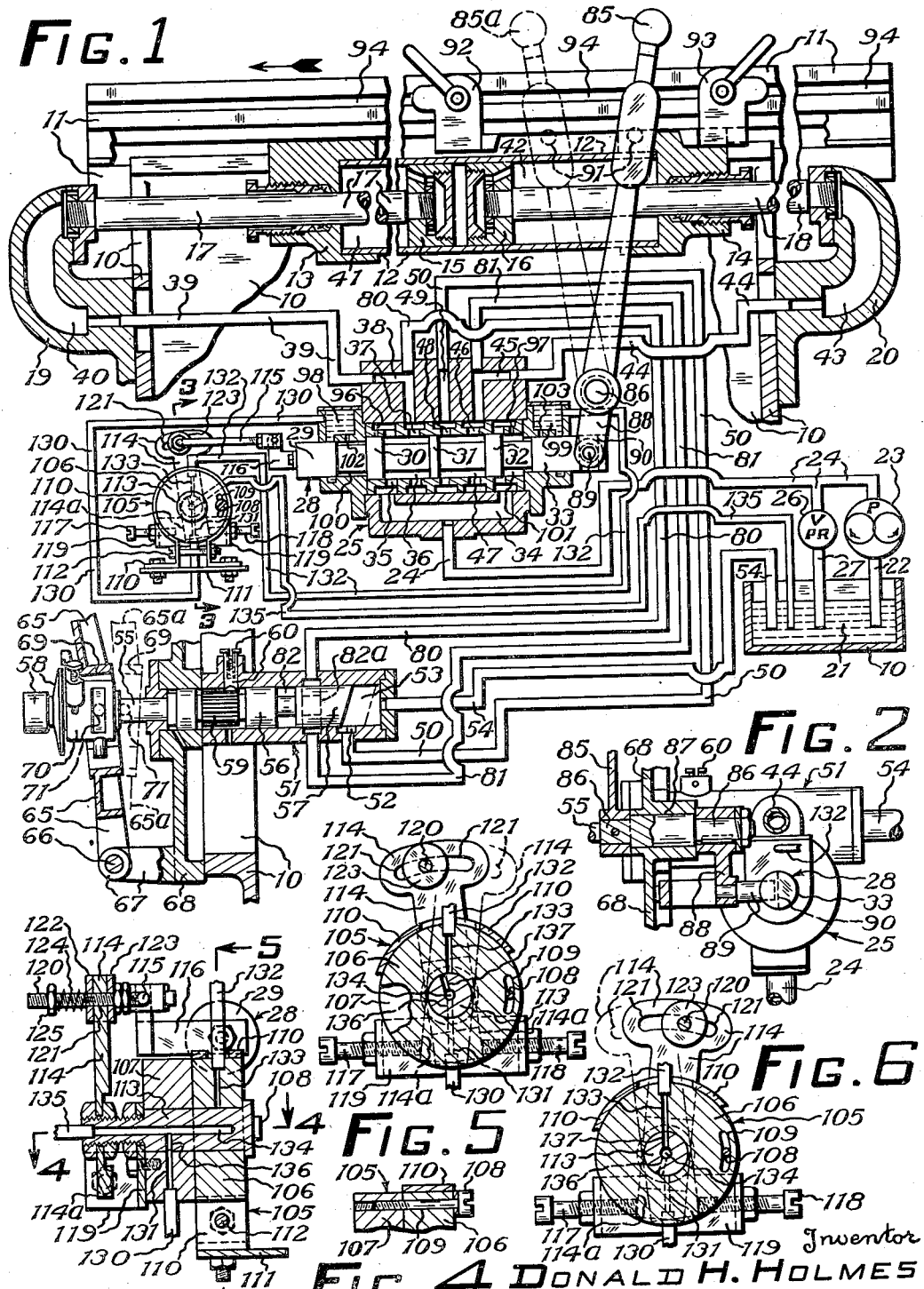

2,302,909

UNITED STATES PATENT OFFICE 2,302,909

HYDRAULIC TABLE RECIPROCATING MECHANISM

Donald H. Holmes, Worcester, Mass., assignor to Norton Company, Worcester, Mass., a corporation of Massachusetts Application June 17, 1942, Serial No. 447,461

10 Claims. (Cl. 121—45)

The invention relates to grinding machines, and more particularly to a hydraulically operated table reciprocating mechanism for a grinding machine.

One object of the invention is to provide a simple and thoroughly practical table reciprocating and reversing mechanism. Another object of the invention is to provide a hydraulically operated table reciprocating mechanism in which a table actuated reversing valve is shifted by movement of the table to stop the flow of fluid in one direction and in which the valve is shifted into a reverse position by fluid under pressure.

Another object of the invention is to provide a table reversing mechanism including a table actuated reversing valve which is shifted into a reverse position by fluid under pressure, and in which a control valve actuated by and in timed relation with the reversing valve serves to facilitate positive reversal of the valve. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawing in which is shown one of various possible embodiments of the mechanical features of this invention, Fig. 1 is a hydraulic diagram of the improved table traversing mechanism;

Fig. 2 is a fragmentary vertical sectional view, on an enlarged scale, through the reversing lever and associated parts;

Fig. 3 is a fragmentary vertical sectional view, on an enlarged scale, taken approximately on the line 3—3 of Fig. 1;

Fig. 4 is a fragmentary sectional view, taken approximately on the line 4—4 of Fig. 3, showing the clamping and adjusting mechanism for the valve;

Fig. 5 is a vertical sectional view, taken approximately on the line 5—5 of Fig. 3; and Fig. 6 is a similar vertical sectional view but with the valve parts shifted to the reverse position.

As illustrated in the drawing, the machine embodying this invention comprises a base 10 which supports a longitudinally reciprocable work supporting table 11 on the usual V-way and flat way (not shown) for a longitudinal reciprocatory movement relative to the base 10.

A fluid operated reciprocating mechanism is provided to reciprocate the table 11, comprising a fluid pressure cylinder 12 which is fixedly supported by bracket end caps 13 and 14 fixedly mounted on the under side of the table 11. The cylinder 12 contains a pair of spaced pistons 15 and 16 which are connected by a pair of hollow piston rods 17 and 18, respectively, with a pair of hollow brackets 19 and 20, respectively, mounted on opposite ends of the base 10. The base 10 is preferably formed as a box-like structure containing in its lower portion a reservoir 21 for the fluid pressure system. Fluid is drawn from the reservoir 21 through a pipe 22 by means of a motor driven fluid pressure pump 23. The pump 23 forces fluid under pressure through a pipe 24 to a table control valve 25. A variable pressure relief valve 26 is connected in the pipe line 24 for passing excess fluid under pressure directly through a pipe 27 into the reservoir 21 so as to facilitate maintaining a uniform operating pressure within the hydraulic system.

The control valve 25 is preferably a piston type reversing valve which includes a movable valve stem 28 having formed integrally therewith a plurality of valve pistons 29, 30, 31, 32 and 33. Fluid under pressure from the pump 23 is forced through the pipe 24 into a chamber 34 formed in the valve casing 25. In the position of the valve (Fig. 1), fluid under pressure within the chamber 34 passes through a port 35 into a valve chamber 36 located between the valve pistons 30 and 31 and passes outwardly through a port 37, through a passage 38, through a pipe 39, through a hollow chamber 40 within the bracket 19, and through the hollow piston rod 17, into a cylinder chamber 41 to move the cylinder 12 and table 11 toward the left (Fig. 1). During the movement of the cylinder 12 and table 11 toward the left, fluid within a cylinder chamber 42 is exhausted through the hollow piston rod 18, through a hollow chamber 43 in the bracket 20, through a pipe 44, through a passage 45, through a port 46, into a cylinder chamber 47 located between the valve pistons 31 and 32. Fluid exhausting into the valve chamber 47 passes outwardly through a port 48, through a passage 49, and a pipe 50 to a combined stop and start and speed control valve 51. Fluid exhausting through the pipe 50 passes through a V-shaped port 52 in the valve 51, into a valve chamber 53, and exhausts therefrom through a pipe 54, into the reservoir 21.

The speed control valve 51 is preferably formed as an integral part of the valve 25 but for the sake of simplicity of illustration has been illustrated diagrammatically in Fig. 1 as a separate valve unit. The valve 51 is preferably located in the exhaust side of the system so as to maintain a uniform fluid pressure on the operative side of the main cylinder during the entire reciprocatory stroke of the cylinder relative to the pistons. The valve 51 comprises a valve stem 55 having formed integrally therewith valve pistons 56 and 57. The throttle or control valve 51 is arranged so that it may be moved longitudinally from the full line to the dotted line position. The valve stem 55 is provided with an actuating knob 58 to facilitate a rotary adjustment of the valve. The right-hand end of the valve piston 57 is formed as an angular plane surface. By a rotary adjustment of the valve stem 55, the angular end surface of the valve piston 57 may open or close the V-port 52 to the desired and predetermined extent and serves as a fine adjustment to cut off more or less of the exhaust of fluid from the system, thereby precisely to regulate the reciprocatory speed of the table 11.

In order that the valve piston 57 may be maintained in the desired adjusted position, a serrated portion 59 is formed integral with the valve stem 55. A spring-pressed arrow-pointed plunger 60 is supported by the casing of the valve 51 and is maintained in engagement with the serrated portion so that he valve stem 55 may be moved endwise or axially to stop or start the table movement without changing the speed adjustment thereof.

A manually operable start and stop lever 65 is pivotally supported by a stud 66 which is in turn supported by a projecting boss 67 formed integral with an apron 68 which is fixedly supported on the front of the machine base 10. The lever 65 is provided with a clearance aperture 69 which surounds a sleeve 70. The sleeve 70 is connected by a pair of diametrically opposed studs 71 with the control lever 65. It will be readily apparent from the foregoing disclosure that when the control lever 65 is in the position indicated in full lines (Fig. 1), the V-port 52 will be uncovered, allowing the table to move at a desired speed governed by the rotary adjustment of the valve stem 55.

When it is desired to stop the reciprocatory movement of the table 11, the control lever 65 is shifted in a clockwise direction into broken line position 65a, which movement shifts the valve stem 55 together with the valve pistons 56 and 57 toward the right (Fig. 1) into the broken line position so that the valve piston 57 closes the V-port 52, thus cutting off the exhaust of fluid from the table cylinder 12 to stop the reciprocatory movement of the table 11.

When the throttle valve is in a closed position, it is desirable to provide a suitable by-pass whereby fluid may readily pass from the cylinder chamber 41 into the cylinder chamber 42 and vice versa to facilitate a manual traversing movement of the table 11. A pipe 80 is connected between the passage 38 in the valve 25 and the valve 51. Similarly, a pipe 81 is connected between the pasage 45 in the valve 25 and with the valve 51. When the valve stem 55 is moved toward the left (Fig. 1) into a table stop position, a valve chamber 82 located between the valve pistons 56 and 57 moves into position 82a so that fluid may readily pass between the pipes 80 and 81 to facilitate a free passage of fluid between the opposite end chambers of the table cylinder 12, so that the table 11 may be readily moved longitudinally without the necessity of overcoming fluid within the pressure system.

A manually operable table traverse mechanism may be utilized such as, for example, that shown in the prior U. S. Patent No. 2,071,677, and may comprise a manually operable hand wheel and a rack and gear mechanism for moving the work supporting table longitudinally. This mechanism is not considered to be a part of the present invention and consequently has not been illustrated or described in detail. For further details of the manual traversing mechanism, reference may be had to the U. S. Patent above referred to.

A table actuated mechanism is provided for initiating a shifting movement of the reversing valve 25, comprising a reversing lever 85 which is supported on a rock shaft 86. The rock shaft 86 is journalled in a bearing 87 formed in the apron 68. A short downwardly extending lever 88 is fixedly mounted on the inner end of the rock shaft 86 and is provided with a stud 89 which engages or rides in a vertically extending groove 90 formed in the valve stem 28. The reversing lever 85 is provided with a rearwardly extending stud 91 which is arranged in the path of a pair of adjustably mounted table dogs 92 and 93. The table dogs 92 and 93 are adjustably supported by a T-slot 94 formed in the front face of the work supporting table 11.

As illustrated in Fig. 1, fluid under pressure entering the valve chamber or passage 34 may pass through either a port 96 or a port 97 into either a valve chamber 100 or a valve chamber 101, respectively. The valve chambers 100 and 101 are formed between the valve pistons 29, 30, 32 and 33, respectively. Fluid under pressure passes from the chambers 100 and 101, through ports 102 and 103, into reservoirs 98 and 99, respectively, formed within the end portions of the valve 25.

The effective areas of the pistons 29 and 33 are considerably less than the effective areas of the valve pistons 30 and 32, respectively. By providing the differential in pressure areas between these pistons, the valve chambers 100 and 101 serve to function as a pilot valve and cause a reversal of the reversing valve 25 under the influence of fluid pressure whenever the valve is moved to a position slightly by the center position; that is, so that either the port 96 or the port 97 is cut off to a greater extent than the other, allowing fluid under pressure to flow into the valve chamber 100 or 101. Due to the differential piston areas, fluid under pressure entering either the valve chamber 100 or 101 serves to move the valve either toward the right or toward the left, as viewed in Fig. 1.

A rotary type valve 105 is provided for controlling the exhaust of fluid from the reservoirs 98 and 99, respectively. The valve 105 comprises a pair of disk-shaped valve members 106 and 107 which are adjustably fastened together by means of a clamping screw 108. The clamping screw 108 passes through an arcuate-shaped elongated slot 109 formed in the valve member 106 and is screw threaded into the valve member 107. A circular-shaped strap 110 surounds the periphery of the disk-shaped valve member 106 and is fixedly fastened to a supporting plate 111. A clamping screw 112 (Fig. 1) is arranged to clamp the strap in adjusted position relative to the disk-shaped valve member 106.

It will be readily apparent from the foregoing disclosure that the valve members 106 and 107 are adjustable relative to each other and are angularly adjustable by loosening the supporting clamp, if desired. A valve rotor 113 is rotatably suported within the valve members 106 and 107. An actuating lever 114 is adjustably fixed to the valve rotor 113. The lever 114 is connected by a link 115 with a bracket 116. The link 115 is pivotally connected to a bracket 116 fastened to the left-hand end of the valve piston 29. A pair of opposed spaced stop screws 117 and 118 are suported by a bracket 119 which is fixedly mounted in position on the valve member 107. The screws 117 and 118 are arranged in the path of a downwardly extending projection 114a of the valve actuating lever 114 and serve to limit the oscillatory stroke of the lever 114 as desired.

Only a slight motion of the valve rotor 113 is required; consequently it is desirable to provide a frictional connection between the valve actuating lever 114 and the link 115 so that the reversing valve 25 is free to move through its entire extent. This friction device may comprise a stud portion 120 formed integral with the link 115 which passes through an elongated arcuate-shaped slot 121 formed in the upper end of the lever 114. A pair of friction washers 122 and 123 are supported on the stud 120 and are arranged on opposite sides of the lever 114 (Fig. 3). A compression spring 124 surrounds the stud 120 and is interposed between a nut 125 supported on the threaded stud 120 and the friction washer 122. By adjusting the nut 125, the compression of the spring 124 may be varied as desired to provide the desired frictional connection between the link 115 and the lever 114.

A pipe 130 connects the reservoir 98 with a passage or port 131 formed in the valve member 107. Similarly, a pipe 132 connects the valve reservoir 99 with a passage or port 133 formed in the valve member 106. The valve rotor 113 is provided with a central chamber 134 which is connected by a pipe 135 with the reservoir 21. A pair of radially extending passages or ports 136 and 137 are provided in the valve rotor 113. These ports or passages 136 and 137 are arranged alternately to align with the ports or passages 131 and 133, respectively, formed in the stationary part of the valve 105.

By adjusting the stop screws 117 and 118, the oscillatory stroke of the lever 114 may be varied as desired. The stop screw 117 serves to limit the stroke of the lever 114 in a clockwise direction (Fig. 6) so that in its end position, the port or passage 137 is aligned with the port or passage 133. Similarly, the stop screw 118 is adjusted to limit the swinging movement of the lever 114 in a counterclockwise direction (Fig. 5) so that in the full line position of the lever 114, the passage or port 136 will be aligned with the port or passage 131.

The valve 105, as illustrated in Fig. 1, serves to allow free exhaust of fluid from the reservoir 98 while preventing exhaust of fluid or leakage of fluid from the valve 25 to return to the reservoir. The main function of the valve 105 is to prevent leakage of fluid by the valve pistons 29 and 30 so that the entire force of the fluid under pressure may be utilized to shift the valve 25 into its reverse position. Similarly, when the parts of the valve 105 are reversed at the other end of the table stroke, the valve 105 prevents leakage of fluid by the valve pistons 32 and 33 from exhausting into the reservoir so that the full effect of the fluid under pressure within the system may be utilized to shift the reversing valve 25 into its reverse position.

The operation of the improved table traversing mechanism will be readily apparent from the foregoing disclosure. Assuming the table 11 to be traveling toward the left, as indicated by the arrow in Fig. 1, this movement continues until the table dog 93 engages the stud 91 on the reversing lever 85 to rock it in a counterclockwise direction. This movement of the reversing lever shifts the valve piston 28 toward the right (Fig. 1) so that the valve piston 31 gradually closes the port 48 to cut off the exhaust of fluid from the cylinder chamber 42.

As soon as the valve piston 30 moves sufficiently toward the right under the influence of the reversing lever 85 to uncover the port 96, fluid under pressure is admitted to the valve chamber 100. During this initial movement of the reversing valve 25, the rotary valve 105 is actuated, that is, the lever 114 is shifted in a clockwise direction (Figs. 1 and 5) so that the passage 137 is aligned with the passage or port 133. At the same time, the passage or port 136 is thrown out of alignment with the port or passage 131 into the position shown in Fig. 6. With the parts as illustrated in Fig. 6, fluid within the reservoir 99 is free to exhaust through the pipe 132, through the port or passage 133, and the port or passage 137 and to pass through the central passage 134 in the rotary valve part 113 and out through the pipe 135 into the reservoir 21.

When the valve is in the position illustrated in Fig. 6, the port or passage 131 is closed so that any fluid leaking by the pistons 29 or 30 is confined within the reservoir 98 and cannot pass through the exhaust pipe to the reservoir 21. As soon as the port 96 is uncovered by movement of the valve piston 30 toward the right, fluid under pressure entering the valve chamber 100, due to differential piston areas of the pistons 29 and 30, serves to shift the valve stem 28 toward the right into its extreme right-hand end position so that fluid under pressure from the pump 23 passing through the pipe 24 enters the valve chamber 47 and passes through the port 46, the passage 45, the pipe 44, into the cylinder chamber 42 to start the table 11 moving toward the right (Fig. 1). During the latter part of the shifting movement of the reverse valve 25, the rotary valve 105 remains stationary and due to the friction device above described, the stud 120 slides within the elongated slot 121. It will be readily apparent that the rotary member 113 of the valve 105 only moves through a slight angular stroke during the initial shifting movement of the valve piston 28 in either direction.

The operation of the reversing mechanism is substantially identical at the other end of the table stroke; the valve 105 is shifted during the initial movement of the reversing valve 25 so that fluid is free to exhaust from the reservoir 98 while fluid is confined within the reservoir 99.

If it is desired to stop the reciprocatory movement of the table 11, the control lever 65 may be shifted in a clockwise direction into position 65a. This movement serves to shift the valve piston 57 to close the V-port 52, thus cutting off exhaust of fluid from the table cylinder 12. When the valve 51 is in a stopped position, the pipe 80 is directly connected with the pipe 81 through a valve chamber 82 which is then in position 82a shown in broken lines in Fig. 1, so that fluid may readily by-pass between the cylinder chamber 41 and the cylinder chamber 42 to facilitate a manual traversing or adjusting movement of the table 11.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:

1. In a grinding machine having a longitudinally reciprocable table, a piston and cylinder to reciprocate said table, means including a piston type reversing valve to convey fluid under pressure to either end of said cylinder, means including a reversing lever and adjustable dogs to actuate said reversing valve, pressure chambers in the ends of said reversing valve which serve to shift said valve, enclosed reservoirs in each end of said reversing valve to receive fluid from said end chambers, and a control valve actuated by and in timed relation with said reversing valve to prevent exhaust of fluid from one of said reservoirs while allowing free exhaust of fluid from the other reservoir to facilitate shifting of the reversing valve into a reverse position.

2. In a grinding machine having a longitudinally reciprocable table, a piston and cylinder to reciprocate said table, means including a piston type reversing valve to convey fluid under pressure to either end of said cylinder, means including a reversing lever and adjustable dogs to actuate said reversing valve, pressure chambers in the ends of said reversing valve which serve to shift said valve, enclosed reservoirs in each end of said reversing valve to receive fluid from said end chambers, and a rotary type control valve actuated by and in timed relation with said reversing valve to prevent exhaust of fluid from one of said reservoirs while allowing free exhaust of fluid from the other reservoir to facilitate shifting of the reversing valve into a reverse position.

3. In a grinding machine having a longitudinally reciprocable table, a piston and cylinder to reciprocate said table, means including a piston type reversing valve to convey fluid under pressure to either end of said cylinder, means including a reversing lever and adjustable dogs to actuate said reversing valve, pressure chambers in the ends of said reversing valve which serve to shift said valve, enclosed reservoirs in each end of said reversing valve to receive fluid from said end chambers, a control valve actuated by and in timed relation with said reversing valve, and operative connections between said rotary valve and said reservoirs to prevent exhaust of fluid from one of said reservoirs while allowing free exhaust of fluid from the other reservoir to facilitate shifting of the reverse valve into a reverse position.

4. In a grinding machine having a longitudinally reciprocable table, a piston and cylinder to reciprocate said table, means including a piston type reversing valve to convey fluid under pressure to either end of said cylinder, means including a reversing lever and adjustable dogs to actuate said reversing valve, pressure chambers in the ends of said reversing valve which serve to shift said valve, enclosed reservoirs in each end of said reversing valve to receive fluid from said end chambers, a rotary type control valve actuated by and in timed relation with said reversing valve, and operative connetcions between said rotary valve and said reservoirs to prevent exhaust of fluid from one of said reservoirs while allowing free exhaust of fluid from the other reservoir to facilitate shifting of the reverse valve into a reverse position.

5. In a grinding machine having a longitudinally reciprocable work table, a piston and cylinder to reciprocate said table, means including a piston type reversing valve to convey fluid under pressure to either end of said cylinder, means including a reversing lever and adjustable dogs to actuate said valve, pressure chambers in the ends of said reversing valve formed between spaced valve pistons therein, the adjacent pistons of each chamber having differential effective areas to facilitate shifting of the reversing valve when fluid under pressure is admitted to the end chamber, enclosed reservoirs in each end of said reversing valve to receive fluid from said end chambers, and a control valve actuated by and in timed relation with said reversing valve to prevent exhaust of fluid from one of said reservoirs while allowing free exhaust of fluid from the other reservoir to facilitate shifting of the reversing valve into a reverse position.

6. In a grinding machine having a longitudinally reciprocable work table, a piston and cylinder to reciprocate said table, means including a piston type reversing valve to convey fluid under pressure to either end of said cylinder, means including a reversing lever and adjustable dogs to actuate said valve, pressure chambers in the ends of said reversing valve formed between spaced valve pistons therein, the adjacent pistons of each chamber having differential effective areas to facilitate shifting of the reversing valve when fluid under pressure is admitted to the end chamber, enclosed reservoirs in each end of said reversing valve to receive fluid from said end chambers, ports connecting said end chambers with said reservoirs, respectively, and a control valve actuated by and in timed relation with said reversing valve to prevent exhaust of fluid from one of said reservoirs while allowing free exhaust of fluid from the other reservoir to facilitate shifting of the reversing valve into a reverse position.

7. In a grinding machine having a longitudinally reciprocable work table, a piston and cylinder to reciprocate said table, means including a piston type reversing valve to convey fluid under pressure to either end of said cylinder, means including a reversing lever and adjustable dogs to actuate said valve, pressure chambers in the ends of said reversing valve formed between spaced valve pistons therein, the adjacent pistons of each chamber having differential effective areas to facilitate shifting of the reversing valve when fluid under pressure is admitted to the end chamber, enclosed reservoirs in each end of said reversing valve to receive fluid from said end chambers, and a control valve operatively connected to control the exhaust of fluid from said reservoirs which is actuated by and in timed relation with said reversing valve to prevent exhaust of fluid from one of said reservoirs while allowing free exhaust of fluid from the other reservoir to facilitate shifting of the reversing valve into a reverse position.

8. In a grinding machine having a longitudinally reciprocable work table, a piston and cylinder to reciprocate said table, means including a piston type reversing valve to convey fluid under pressure to either end of said cylinder, means including a reversing lever and adjustable dogs to actuate said valve, pressure chambers in the ends of said reversing valve formed between spaced valve pistons therein, the adjacent pistons of each chamber having differential effective areas to facilitate shifting of the reversing valve when fluid under pressure is admitted to the end chamber, enclosed reservoirs in each end of said reversing valve to receive fluid from said end chamber, ports connecting said end chambers with said reservoirs, respectively, and a control valve operatively connected to control the exhaust of fluid from said reservoirs which is actuated by and in timed relation with said reversing valve to prevent exhaust of fluid from one of said reservoirs while allowing free exhaust of fluid from the other reservoir to facilitate shifting of the reversing valve into a reverse position.

9. In a grinding machine having a longitudinally reciprocable work table, a piston and cylinder to reciprocate said table, means including a piston type reversing valve to convey fluid under pressure to either end of said cylinder, means including a reversing lever and adjustable dogs to actuate said valve, pressure chambers in the ends of said reversing valve formed between spaced valve pistons therein, the adjacent pistons of each chamber having differential effective areas to facilitate shifting of the reversing valve when fluid under pressure is admitted to the end chamber, enclosed reservoirs in each end of said reversing valve to receive fluid from said end chambers, a control valve operatively connected to control the exhaust of fluid from said reservoir which is actuated by and in timed relation with said reversing valve, and adjustable stops to limit the movement of said control valve in either direction, said control valve serving to prevent exhaust of fluid from one of said reservoirs while allowing free exhaust of fluid from the other reservoir to facilitate a positive shifting of the reversing valve into a reverse position.

10. In a grinding machine having a longitudinally reciprocable work table, a piston and cylinder to reciprocate said table, means including a piston type reversing valve to convey fluid under pressure to either end of said cylinder, means including a reversing lever and adjustable dogs to actuate said valve, pressure chambers in the ends of said reversing valve formed between spaced valve pistons therein, the adjacent pistons of each chamber having differential effective areas to facilitate shifting of the reversing valve when fluid under pressure is admitted to the end chamber, enclosed reservoirs in each end of said reversing valve to receive fluid from said end chambers, a control valve operatively connected to control the exhaust of fluid from said reservoirs, adjustable stops to limit the movement of said control valve in either direction, and frictional connections between said reversing valve and said control valve whereby the control valve is actuated during the initial movement of said reversing valve in either direction to prevent exhaust of fluid from one of said reservoirs while allowing free exhaust of fluid from the other reservoir to facilitate a positive shifting of the reversing valve into a reverse position.

DONALD H. HOLMES.